Dec. 28, 1937.  R. C. STROUT  2,103,302
BAND APPLYING MACHINE
Filed Feb. 24, 1934  7 Sheets-Sheet 1

INVENTOR
Ralph C. Strout
BY J. Stanley Churchill
ATTORNEY

Dec. 28, 1937.   R. C. STROUT   2,103,302
BAND APPLYING MACHINE
Filed Feb. 24, 1934   7 Sheets-Sheet 3

Fig. 3

INVENTOR
Ralph C. Strout
BY J. Stanley Churchill
ATTORNEY

Dec. 28, 1937.   R. C. STROUT   2,103,302
BAND APPLYING MACHINE
Filed Feb. 24, 1934   7 Sheets-Sheet 6

Dec. 28, 1937.  R. C. STROUT  2,103,302
BAND APPLYING MACHINE
Filed Feb. 24, 1934   7 Sheets-Sheet 7

INVENTOR
Ralph C. Strout
BY J. Stanley Churchill
ATTORNEY

Patented Dec. 28, 1937

2,103,302

UNITED STATES PATENT OFFICE 2,103,302

BAND APPLYING MACHINE

Ralph C. Strout, Wollaston, Mass., assignor, by mesne assignments, to E. I. du Pont de Nemours & Company, Wilmington, Del., a corporation of Delaware Application February 24, 1934, Serial No. 712,853

11 Claims. (Cl. 226—80)

This invention relates to a band applying machine.

One object of the invention is to provide a novel and highly efficient machine for applying bands or sleeves to containers and by which the banded containers may be produced in a rapid and economical manner.

A further and more specific object of the invention is to provide a novel and efficient machine for applying contractible bands or sleeves, such as those of wet regenerated cellulose, to the neck portions of bottles in order to provide the bottles with sealing members shrunk in tightly fitting relation upon the neck thereof and covering at least a portion of the closure therefor so that the sealing band is required to be destroyed in order to open the bottle.

With these general objects in view and such others as may hereinafter appear, the invention consists in the band applying machine and in the various structures, arrangements and combinations of parts hereinafter described and particularly defined in the claims at the end of this specification.

While the different features of the invention may be used with advantage in a band applying machine for the application of various bands to different types of containers, the invention is particularly useful in the application of bands or sleeves of wet regenerated cellulose over the top of filled and capped bottles and onto the neck thereof in such a manner that when the band or sleeve dries it will shrink into tightly fitted relation upon the neck of the bottle covering at least a portion of the closure and forming a sealing member which must be destroyed or broken in order to open the bottle.

In the illustrated machine a supply of the wet regenerated cellulose, bands or sleeves in collapsed condition are preferably stored in a magazine and provision is made for automatically withdrawing successive bands or sleeves from the magazine, opening the same, and applying the open bands over the tops of successive bottles in an automatic, positive and highly efficient manner and into such positions that the bands upon drying may shrink into tightly fitting relation on the necks of the bottles, covering at least a portion of the caps or closures therefor. Provision is also made for automatically conveying the bottles into band applying position preferably by novel mechanism, as will be described, which contributes to the efficiency of the machine and the rapidity with which the banded bottles may be produced.

In the drawings illustrating the preferred embodiment of the invention.

Referring now to the drawings, in the illustrated machine the filled and capped bottles are fed into the machine on an incoming conveyor from which individual bottles are transferred into band applying position intermediate the incoming conveyor and a discharge conveyor and under each of a plurality of band applying mechanism disposed at spaced intervals along the incoming conveyor. The individual bands to be applied are transferred from individual magazines, one for each band applying mechanism, by vacuum operated devices and then opened and positioned over the bottle to be banded. After the band has been applied to the bottle, the banded bottle is transferred to the outgoing conveyor to be discharged from the machine.

Figure 1:
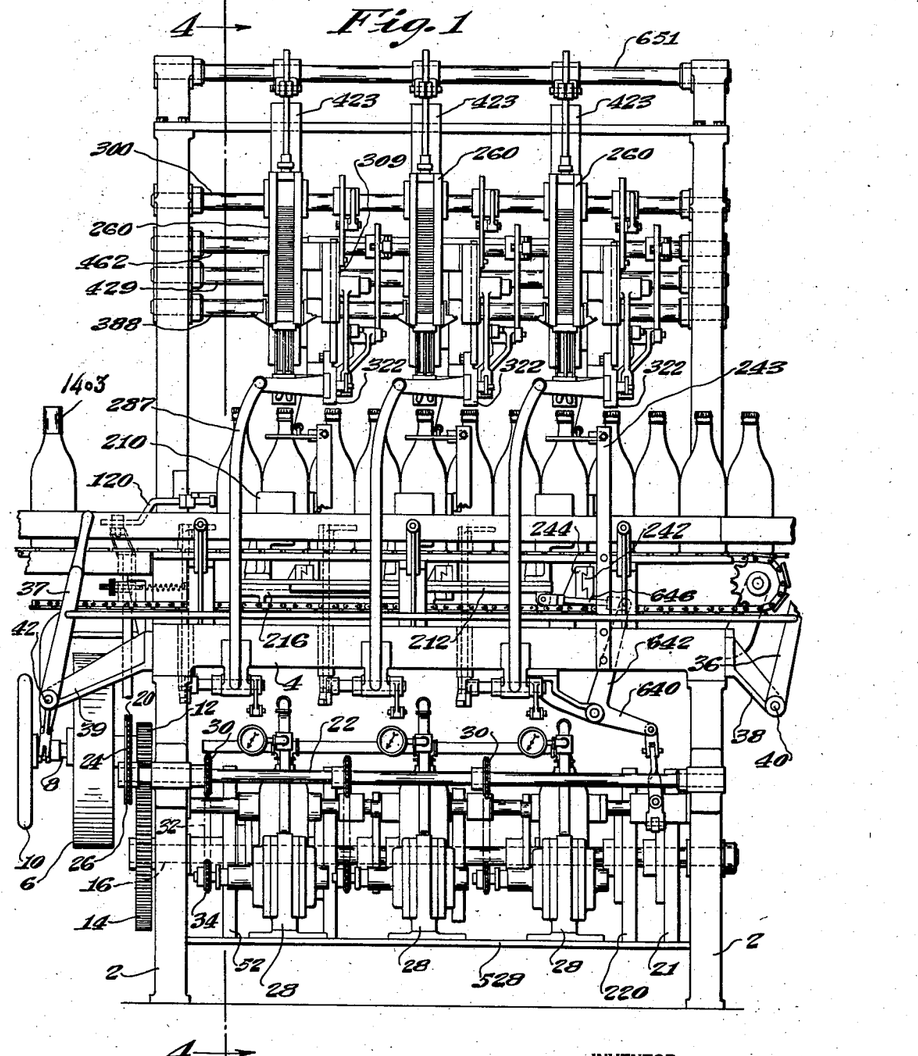
Fig. 1 is a front elevation of the machine.

The machine is mounted upon leg members 2 supporting a platen 4 upon which the main operating mechanisms of the machine are mounted. The driving mechanism for driving the various instrumentalities of the machine is mounted beneath the platen 4 upon suitable shafts journaled in bearings in the supporting legs 2. The driving mechanism may be described as follows: A clutch pulley 6 provided with any suitable commercial form of clutch is mounted to turn free on a shaft 8 when the clutch is disengaged. One end of the shaft 8 is provided with a handwheel 10 to enable the machine to be turned by hand as the occasion may require. The opposite end of the shaft 8 is provided with a gear 12 secured thereon arranged to mesh with a gear 14 on the outer end of a main cam shaft 16 and the latter has mounted thereon all of the cams for performing the various operations of the machine, as will be described. The gear 12 is provided with a sprocket 20 secured thereto which is connected through a chain 24 and sprocket 26 to a shaft 22 so that the shaft is driven from the gear 12. The shaft 22 is provided with a plurality of sprockets 30 individually connected by chains 32 to sprockets 34 secured to the ends of the shafts of a plurality of vacuum pumps 28 of any usual or preferred construction and the vacuum pumps are utilized, as will be described, to create the vacuum employed in transferring and opening the individual bands during the application thereof to the bottles. Provision is also made for enabling an operator to control the machine from either end thereof and to this end the clutch is arranged to be operated by an operating lever or handle 37 mounted upon an operating shaft 42 pivoted in a bracket 39 forming a part of the machine frame and the operating lever 37 is connected by a link to a second operating handle 36 secured on a pin 40 pivoted in a bracket 38, as shown in Fig. 1. The shaft 42 is journaled in a pair of brackets 39, 44 near the opposite ends thereof.

Figure 2:
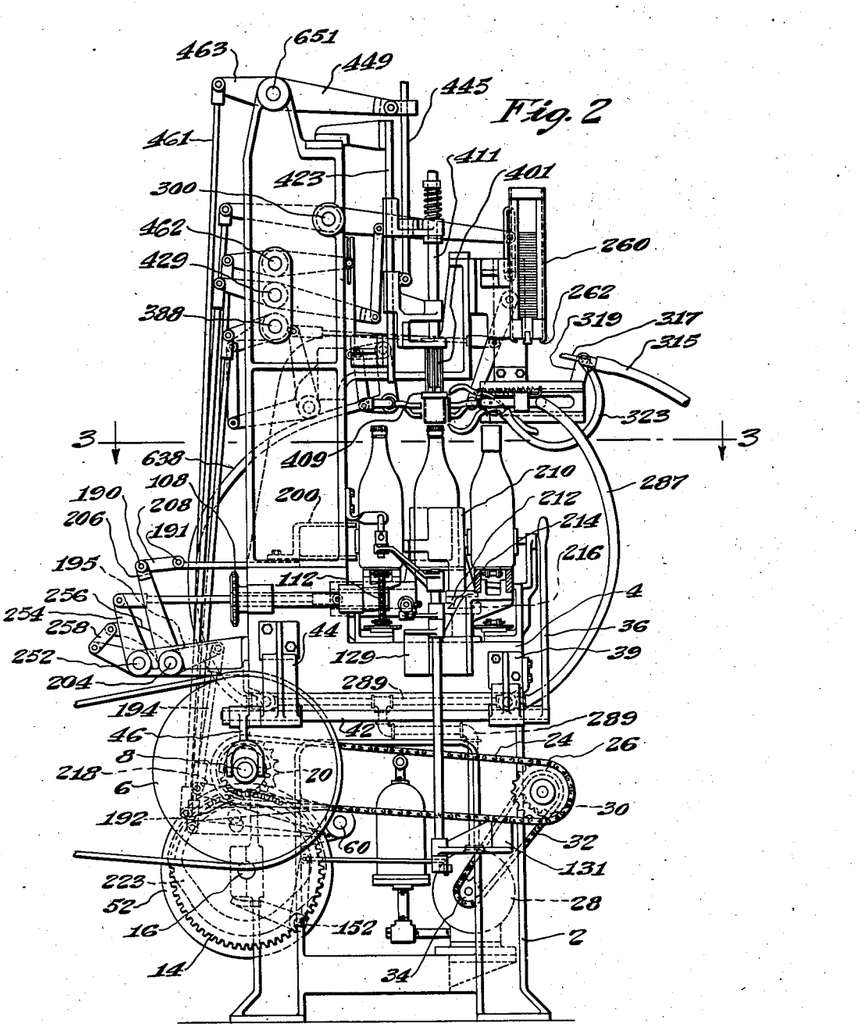
Fig. 2 is a side elevation of the machine viewed from the left in Fig. 1.

In the operation of the illustrated machine, a supply of filled and capped bottles is intermittently fed into the machine by an incoming conveyor 50 of any usual or preferred construction, herein shown as including a conveying chain 114 arranged to run over the usual sprockets at each end thereof, one of which is shown at 112, mounted on a shaft 105. The mechanism for intermittently operating the conveyor 50 as herein shown includes a cam 21 having a cam path 23 cooperating with a cam roll 25 on a cam lever 27 fulcrumed on the shaft 60. The outer end of the cam lever 27 is connected to a rack 62. The rack 62 engages a pinion 66 secured to the shaft 68 to effect oscillation thereof. The shaft 68 is rotatably supported in a bearing 70 formed on the end of a bracket 72 fastened to the platen 4 of the machine. The opposite end of the shaft 68 is supported in a bearing 78 formed in the bracket 80 also secured to the platen 4. A guide bracket 82 is provided to guide the rack 62 in its reciprocating motion and to hold it in engagement with the pinion 66 and is supported on shaft 68 by the hub 86. A ratchet 88 is attached to the hub of the pinion 66 and oscillates back and forth with it. A bevel gear 90 mounted free to turn on the shaft 68 is provided with two spring pressed pawls 92 pivotally mounted on the back thereof and in position to engage the teeth of the ratchet 88. It will thus be observed by reference to Fig. 5 that on the upward stroke of the rack 62, the pawls 92 run free over the ratchet teeth 88 and on the downward stroke of the rack 62 the pawls 92 engage with the teeth of the ratchet 88 and revolve the bevel gear 90, and the latter in turn revolves a cooperating bevel gear 100. The bevel gear 100 is provided with a sprocket 102 attached to the hub thereof and is mounted to turn freely on a stud 104 supported by the bracket 72. The sprocket 102 drives a shaft 105 through a chain 106 and sprocket 108 fastened on the end of the shaft 105. The shaft 105 is mounted to turn in a bearing bracket 110 attached to the platen 4 of the machine. The sprocket 112 secured to the end of the shaft 105, clearly shown in Fig. 2, supports one end of and drives the conveyor chain 114 of the conveyor 50 so that during the operation of the machine the bottles are conveyed in a line by the intermittently operating incoming conveyor 50.

Figures 9, 10, 11:
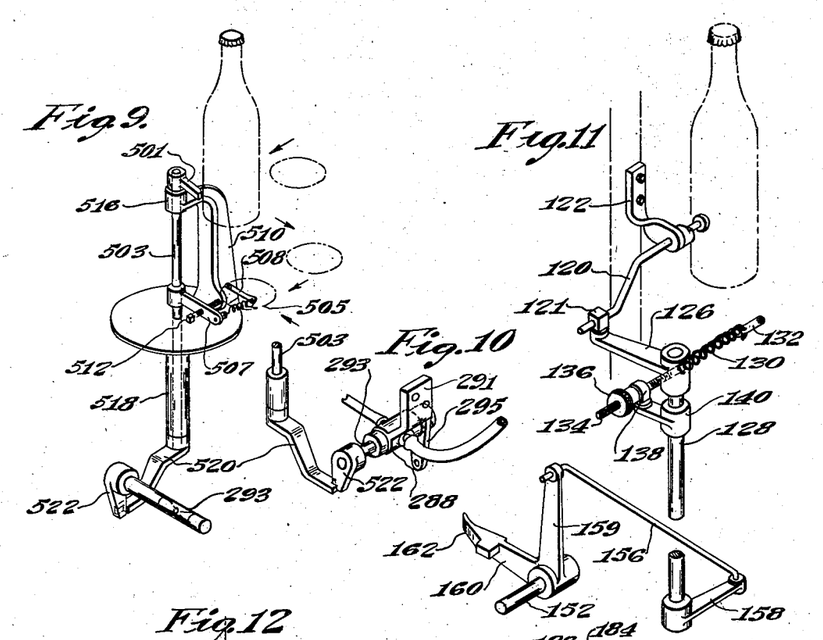
Fig. 9 is a perspective view of the control mechanism for preventing the suction valve from opening when no bottle is fed to the band applying position.
Fig. 10 is a detail view in perspective of the suction valve and stop mechanism.
Fig. 11 is a perspective view of the control mechanism for controlling the movement of bottles from the incoming conveyor.
Figures 12, 13:
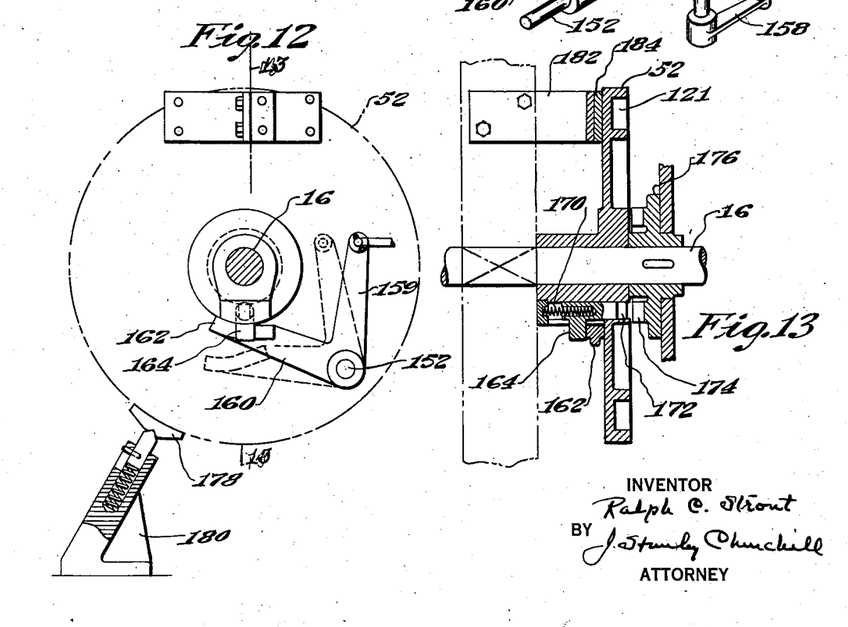
Fig. 12 is a front view of a portion of the clutch mechanism for operating the bottle pushers for removing the bottles from the incoming conveyor.
Fig. 13 is a sectional view on line 13—13 of Fig. 12.

In the normal operation of the machine, the first, fourth and seventh bottles are transferred from the incoming conveyor 50 to band applying stations, by two separate pushing actions. Each of these bottles is transferred by an individual set of mechanisms, including a first pusher for moving the bottle transversely of the machine from the incoming conveyor to a position in front of a second pusher, and the latter operates to move the bottle rearwardly and longitudinally of the machine to the band applying position. To prevent jamming of the machine or breakage of the bottles, provision is made for permitting the starting of the first transverse pushers only when the foremost bottle in the line on the incoming conveyor is properly positioned against a stop member located in the path of travel of the bottles at the inner end of the conveyor. This stop member comprises a movable rod 120, one end of which is slidably mounted in a bearing 122 attached to the machine frame, the outer end thereof being fastened by a swivel connection 121 to the end of a lever 126 keyed to the top of a shaft 128 rotatably supported at its upper end in a bracket 129, and at its lower end in a bracket 131 attached to the platen 4 and leg 2, respectively. Provision is made for normally maintaining the stop rod 120 in an inward direction toward the approaching bottles, herein shown by a spring 130, one end of which is fastened to a spring stud 132 in the frame of the machine, and the other end of which is attached to an adjustable threaded pin 134 having a screw adjustment nut 136 on the outer end thereof for varying the tension of the spring. The pin 134 is guided in the swivel block 138 at the outer end of an arm 140 secured to the shaft 128. A lever 158 is attached to the lower end of the shaft 128, the outer end of which is connected to one arm 159 of a bell crank mounted free to turn on a stud 152 secured in the machine frame. A second arm 160 of the bell crank is provided on its outer end with a disengaging member 162 for disengaging a clutch dog 164 on the cam 52 when a bottle on the incoming conveyor has moved the rod 120 to the left, as shown in Fig. 11. The cam 52 which operates the first pusher to move the bottles from the incoming conveyor 50 is free on the cam shaft 16 unless coupled with a cooperating clutch member which is keyed to the shaft 16. When the bottles are being fed into the machine in a normal manner, the clutch remains effective to rotate the cam 52, otherwise the cam is disengaged from the cam shaft 16 and the first pusher is prevented from functioning. The dog 164 is slidably mounted in a groove in the hub of the cam 52 and is normally pressed forward by a spring 170. The end 172 of the dog engages with a slot 174 in a disc 176 keyed to the shaft 16. It will thus be seen that when the foremost bottle on the incoming conveyor is against the end of the rod 120, the dog disengaging member 162 on an arm 160 is out of the path of travel of the dog 164, as shown by the dotted line in Fig. 12, and the cam 52 is free to rotate.

A spring pressed friction shoe 178 slidably mounted in a bracket 180 secured to the machine frame is provided to press against the outer surface of the cam 52 to check the momentum when the cam is disengaged from the driving member 176 and similarly, a friction member 182 provided with leather friction lining 184 is so located as to bear against the rear surface of the cam 52, further assisting in checking the momentum of the cam 52 when disengaged.

Figure 3:
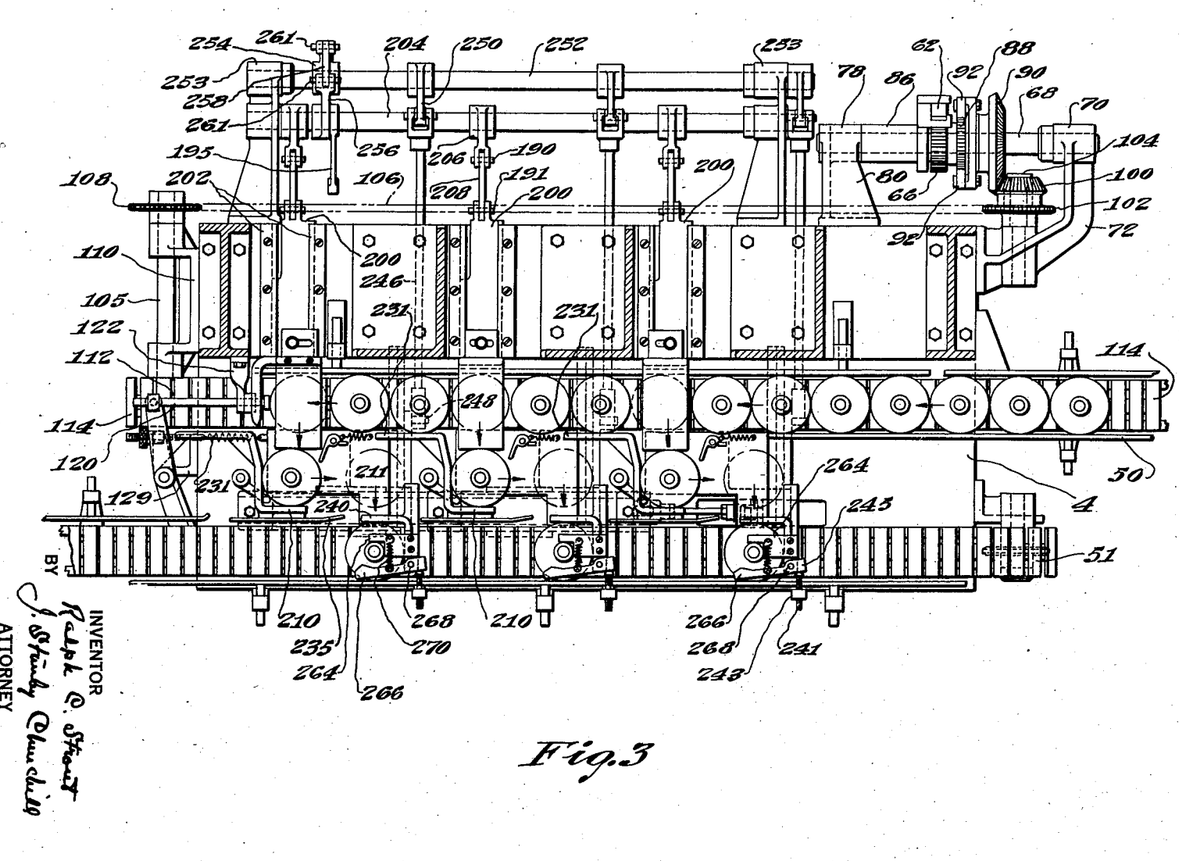
Fig. 3 is a sectional plan view of the machine taken on line 3—3 of Fig. 2.

As previously pointed out in the illustrated machine, three bottles at a time are selected from the incoming conveyor, transferred to the three band applying stations where the bands are applied, and thereafter discharged onto the outgoing conveyor to be conveyed from the machine, and since all three mechanisms for transferring the bottles and applying the bands thereto are alike in construction and mode of operation, a description of one mechanism will suffice for all three. Referring now to Fig. 3, the pusher members 200 are slidably mounted in the platen 4 of the machine, being retained in position by gibs 202 and operated back and forth from a shaft 204 to which the pushers are connected by means of arms 206 and hubs 208 and pins 190, 191. The shaft 204 is rocked by the cam 52 on the shaft 16 to which it is engaged by a clutch mechanism previously described. A cam lever 218 is provided with a cam roll 192 intermediate the ends thereof which cooperates with a cam path 223 on the cam 52. The outer end of the lever 218 is connected by means of a connecting rod 194 to the outer end of a lever 195 secured to the shaft 204. After each bottle is transferred from the incoming conveyor 50 by a pusher 200, it is positioned in front of a sliding pusher member 210 which is arranged to slide longitudinally of the machine to transfer each bottle to the band applying position. Each pusher 210 is mounted upon a slide member 212 having dovetail sliding grooves 214 arranged to slide in similar grooves on a bracket 216 mounted upon the platen 4. The slide 212 is operated by a cam 220 secured to the cam shaft 16 and the cam 220 is provided with a cam groove 221 cooperating with a cam roller 222 mounted on one end 224 of a cam lever fulcrumed on the shaft 60. The other end 226 of the cam lever is connected by a link 228, pins 230, 232 to a swivel connection 234 pivotally connected by a pin 236 to the end of one arm 640 of a bell crank lever. The other arm 642 of the bell crank is connected by means of a connecting rod 646 to the slide 212. It will thus be seen that as the cam 220 revolves with the main cam shaft 16, a reciprocating motion is imparted to each pusher 210, which effects the transfer of the bottles received from the pushers 200, to the band applying positions. Each pusher 210 is also provided with a guide member 231 to aid in holding or maintaining the bottles in line on the incoming conveyor. A guide member 235 is also attached to the opposite end of each pusher 210 to act as a guide for the bottles on the outgoing conveyor.

In the operation of the machine as each of the three bottles being transferred is moved in a rearward direction longitudinally of the machine by the second pushers 210 to the band applying position, each bottle is positioned in front of a third and transversely operating pusher 240, and the bottle is held firmly between the longitudinal pusher 210 and the transverse pusher 240 while the band is being applied. It will be observed by reference to Fig. 3 that both the pushers 210 and 240 are angularly formed, each having two opposed angular sides so that when the bottle is in the band applying position 211, it is held firmly in a hollow square formed by the angular sides of the pushers. After the band has been applied to each of the three bottles, the pusher 240 acts to transfer each bottle from the band applying position 211 onto the outgoing conveyor 51. The pusher 240 is supported on a slide member 242 slidingly supported in a bracket 244 which is secured to the platen 4. The slide member 242 is reciprocated by means of a connecting rod 246, connected to the slide by a pin 248, the other end of the connecting rod being attached to a lever 250 secured to a rocking shaft 252 supported in the brackets 253. The shaft 252 has a rocking motion imparted to it through a lever 254 secured to the shaft 252, and through a lever 256 secured to the shaft 204, and which is connected to the lever 254 by a connecting link 258 and pins 261. It will thus be seen that the cam 52 which rocks the shaft 204 and operates the first pushers 200 also operates the pushers 240 at the same time. Attached to the top portion of the pusher 240 are yielding guide members 264 and 266 which are provided to steady the neck of the bottle while the band is being applied. The guiding member 264 is rigidly attached to the top of the pusher 240 while the portion 266 is yieldingly mounted to turn on a pin 268 and a spring 270 attached to the two members serves to normally hold them in yielding contact with the neck portion of the bottle just below the band as the pusher 240 pushes the bottle onto the outgoing conveyor. A stop screw 241 held in the bracket 243 attached to the machine frame is positioned to contact with the end 245 of the member 266 releasing the neck of the bottle so that the bottle may be carried along by the outgoing conveyor 51.

Figures 4, 7, 8:
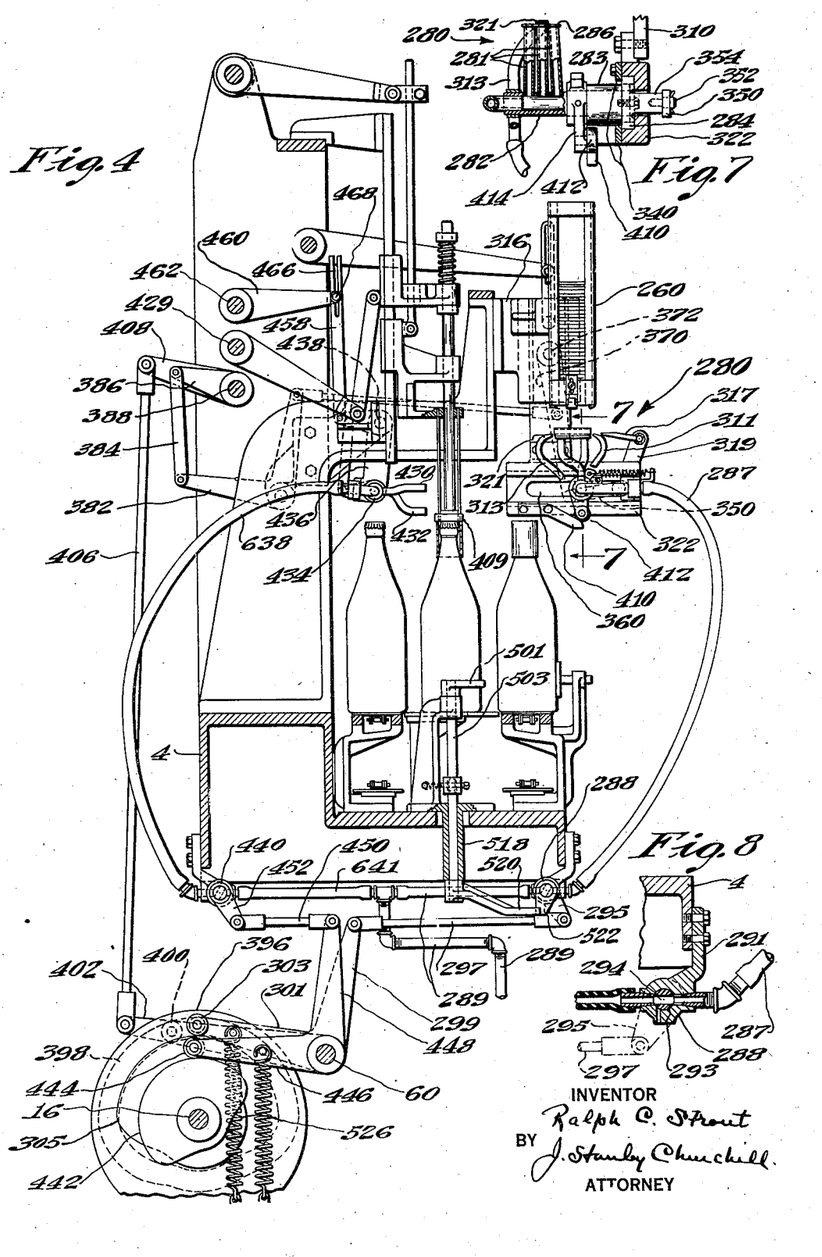
Fig. 4 is a sectional view on line 4—4 of Fig. 1 showing details of the band feeding and applying mechanism.
Fig. 7 is a cross sectional detail taken on line 7—7 of Fig. 4 illustrating the suction feeding mechanism for the bands.
Fig. 8 is a cross sectional view of the suction controlling valve for the band feeding mechanism.

After each of the aforesaid three bottles has been transferred to the band applying station, provision is made for withdrawing a collapsed tubular band or sleeve from the bottom of a vertical stack thereof supported in a magazine 260, and for transferring each band from the horizontal position in which it is withdrawn to a vertical position, and also for thereafter moving the bands to positions immediately above the neck portion of the bottle to which each is to be applied. The collapsed bands are stacked by an operator in the magazines 260 in a wet condition and are supported at the bottom thereof by small projecting fingers 262 in such manner that the lowermost band may be readily removed and the remaining bands retained within the magazine. One band withdrawing and transferring device indicated generally at 280 is mounted to rock in a bearing in a hub 283 formed on a horizontal slide member 284. A plurality of tubes 281 have attached to them at their outer ends a flat suction plate 286 and their inner ends are secured to the hollow sleeve 282. The suction plate is provided with a plurality of openings or ports communicating with the tubes 281 and the latter communicate with the interior of the hollow sleeve 282, so that when suction is created within the hollow sleeve 282 the lowermost band in the magazine may be drawn into contact with the suction plate, as illustrated in Fig. 7. The hollow sleeve 282 is connected with the suction pump through pipe connections 287, suction control valve 288 and connecting pipes 289, and through a connecting elbow 285. A vertical reciprocatory motion is imparted to the band feeder 280 by a cam 500 keyed to the main cam shaft 16 and provided with a cam path 502 cooperating with a cam roll 504 on a cam lever 506 pivotally supported on the shaft 60, the outer end of the cam lever 506 being connected to a lever 296 by a connecting rod 298 and imparts a rocking motion to a shaft 300 to which the lever 296 is secured. A lever 302 is secured to the shaft 300 and imparts a sliding motion to a slide 310 through a slotted connecting rod 304 to which it is connected by a clamping connecting screw 306 in a slot 308. The second end of the connecting rod 304 is connected to a vertical slide 310 through a pin 312. The vertical slide 310 is slidably mounted in a bracket 316 which in turn is fastened to and supported on a bracket 318 attached to the platen 4. The vertical slide 310 is retained in sliding position by suitable gibs 309. Attached to the lower end of the slide 310 is a horizontal slide bracket 322 which forms a sliding support for the slide member 284 upon which the band feeder 280 is mounted. The slide 284 is retained in sliding position by a gib 340 attached to the member 322. A horizontal sliding motion is imparted to the slide 284 by means of a link 350, one end of which is connected to the slide by a pin 352 fastened to a hub 354. A slot 360 is provided in the bracket 322 to permit the reciprocatory motion of the hub 354 therein. The second end of the connecting rod 350 is connected to a lever 370 mounted free to swing on a pin 372 attached to the vertical slide 310. A connecting rod 374 is pivotally connected at one end to the lever 370 by a pin 376, and at the other end to one arm 378 of a bell crank lever by a pin 380. The outer end of the second arm 382 of the bell crank lever is connected by a link 384 to a lever 386 secured to a shaft 388 by connecting pins 390. The shaft 388 is rocked by a cam 396 secured to the main cam shaft 16 and having a cam path 398 cooperating with a cam roller 400 supported on a cam lever 402 pivotally mounted on the shaft 60. The cam lever 402 is operatively connected to a lever 408 secured to the shaft by a connecting rod 406.

From the above description it will be observed that as the band feeder slide 284 is moved to the left, viewing Fig. 4, the band feeder 280 is caused to rotate in a counterclockwise direction to bring the collapsed band from a horizontal to a vertical position. This rotation is effected by a cam 410 attached to a bracket 322 through contact with a roller 412 carried on an arm 414 secured to the sleeve 282.

Provision is made for applying suction to the band feeder at the time in the operation of the machine when the suction plate 286 is in contact with the lowermost band in the magazine, causing the same to be removed therefrom and held upon the suction plate 286 until the applying device operates to place it on the bottle. To this end, the valve 288 is formed in a bracket 291 attached to the platen 4 and comprises a rocking shaft 293 having a valve port 294 adapted to be rocked by a lever 295 fastened to the outer end of the valve shaft 293 and connected by a connecting rod 297 to one arm 299 of a bell crank 301 pivotally mounted on the shaft 60. The other arm of the bell crank 301 is provided with a cam roll 303 cooperating with an open cam 305 secured to the main cam shaft 16. It will thus be seen that the maintenance of suction at the suction plate 286 is so controlled by the valve 288 that suction is applied when the suction plate 286 contacts with the lowermost band in the magazine and is maintained to hold the band thus removed until it is delivered to the band applying device hereinafter to be described.

Provision is further made for assisting the removal of the band from the bottom of the magazine by the band feeder 280 and for opening the band to facilitate the entry of the applying mechanism for applying the band to the bottle neck at the band applying position. As herein shown, air is supplied under pressure from any convenient external source of supply through a pipe 315 to an air jet or nozzle 317 attached to an arm 319 fastened to the horizontal slide bracket 322 and so positioned that when the suction plate 286 comes in contact with the lowermost band in the magazine, a jet of air will be projected against the edges of the bands in the lower portion of the magazine tending to separate them. In addition, tubes 311, 313 having nozzle-like ends 321 are positioned to direct an air jet into a band held by the suction plate to open the band. The tubes 311, 313 are attached to and rotate with the sleeve 282, being joined together at their lower ends and connected to a pipe 323, and the latter is connected with the air pressure supply pipe 315. It will thus be seen that when a band is held by suction upon the suction plate 286, a jet of air will be projected from the pipes 311, 313 against the end of the collapsed band or sleeve tending to cause it to be opened.

Figures 5, 6:
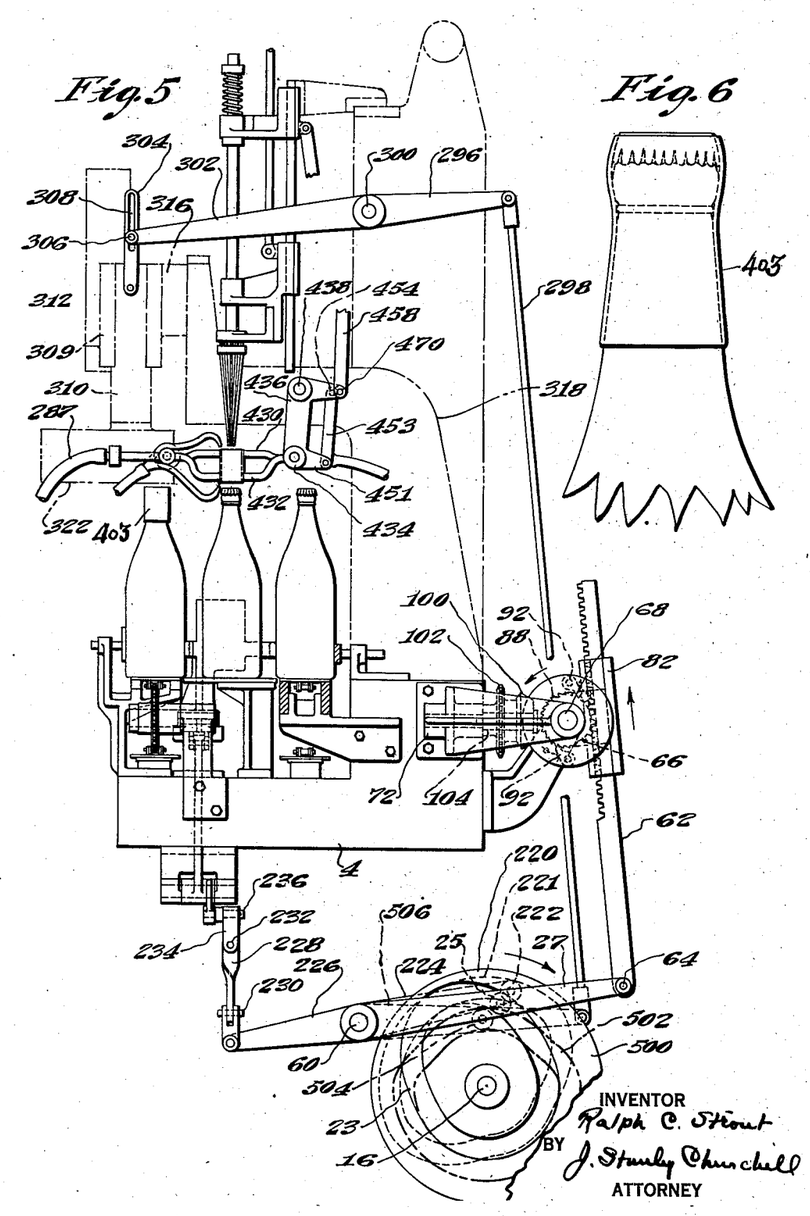
Fig. 5 is a detail view of the incoming conveyor drive and band applying mechanism in one position of operation.
Fig. 6 is an enlarged detail showing a band shrunk in position on the neck portion of the bottle and over the skirt of the cap.

After the band or sleeve has been moved into band applying position as shown in Fig. 5, a second suction member is caused to engage the opposite or free surface of the band to assist in opening it into tubular form and to thereby enable the applying mechanism to enter the band and apply it to the neck of the bottle. This second suction member comprises suction tubes 430 and 432 attached to a hollow sleeve 434 rotatably mounted on an arm 436. The end of the hollow sleeve 434 is connected to the suction pump 28 through pipes 638, a valve 440, and the pipes 641 and 289. The valve 440 is the same in construction as the valve 288 above described, being operated to open and close the suction line in proper timed relation, by means of a cam 442 attached to the shaft 16, acting upon a cam roll 444 mounted on the end of an arm 446 of a bell crank lever 448 pivoted on the shaft 60. The second end of the bell crank lever 448 is connected by means of a connecting rod 450 to a valve operating arm 452 which operates the valve 440.

Referring now to Fig. 5, the arm 436 which carries the hollow sleeve 434 and the suction members 430, 432 is mounted to swing freely on a stud 438 fastened in the bracket 318. The tubular sleeve 434 is mounted to turn in the lower end of the arm 436 having at one end thereof an arm 451. The outer end of the arm 451 is connected by a link 453 to a fixed stud 454 secured to the bracket 318. An arm 456 formed as a part of the upper portion of the arm 436 is connected by an adjustable connecting rod 458 to the outer end of an arm 460 secured to a shaft 462. The connecting rod 458 is provided in its upper end with an adjusting slot 466 with which a clamping bolt 468 in the end of the arm 460 cooperates, to adjustably clamp the upper end of the connecting rod 458 with the arm 460. The lower end of the connecting rod 458 is pivotally connected to the arm 456 by a pin 470 so as to provide a substantially straight-line horizontal motion to the suction members 430, 432, as the latter are moved into and from the band applying station. The shaft 462 has a rocking motion imparted to it by a cam 471 secured to the shaft 16, and the cam has a cam path 472 cooperating with a roller 477 located intermediate the ends of a lever 455 pivoted on the shaft 60. The outer end of the lever 455 is connected by a connecting rod 615 to the outer end of the lever 418 which is secured to the shaft 462.

After the band has been removed from the magazine and positioned in applying position in substantially cylindrical form by the mechanisms previously described, provision is made for thereafter placing it over the neck of the bottle and in a position where it extends at least over the skirt portion of the bottle cap. For this purpose, as herein shown, a series of spring wires 401 are mounted at one end in a hub 403, on an arm 405 formed on the lower part of a bracket 407. The wires 401 are positioned with their upper ends arranged in a circle and so that normally the lower ends will converge together to form a substantially pointed end. A sliding collar 409 is provided with a ring of holes spaced to correspond with the spacing of the wires 401 and through which the wires 401 project in freely sliding relation. The sliding collar 409 is mounted on the end of a rod 411 arranged to slide through the hub 403 and the bearing 413 of the bracket 407. The upper end of the rod 411 is secured to a sliding bracket 415 in a yielding manner, and is provided with a collar 417 secured thereto. A compression spring 419 encircling the rod 411 is interposed between a collar 421 secured to the rod 411 and the bracket 415. The latter is arranged to slide on a slide member 423 secured to the machine frame and is operated through a connecting rod 425 connecting the sliding bracket 415 to the outer end of an arm 427 fast on a shaft 429. The shaft 429 has imparted to it a rocking motion by a cam 431 provided with a cam path 433 cooperating with a roll 435 located intermediate the ends of a lever 437 pivotally mounted on the shaft 60. The outer end of the lever 437 is connected by a connecting rod 439 to the outer end of an arm 441 secured to the shaft 429. It will thus be seen, that as the head 409 is moved downwardly from the position shown in Fig. 14 to that shown in Fig. 4, the spring wires 401 will be caused to straighten out or expand and thus expand and round out the band into which they extend so that the opened band will slide over the neck of the bottle. The head 409 not only acts as a spreader for the wires 401, but also acts as a pusher for the end of the expanded band 1403 to force it from the wires 401 and onto the neck of the bottle, and upon drying the band 1403 shrinks into the position illustrated in Fig. 6.

Figures 14, 15:
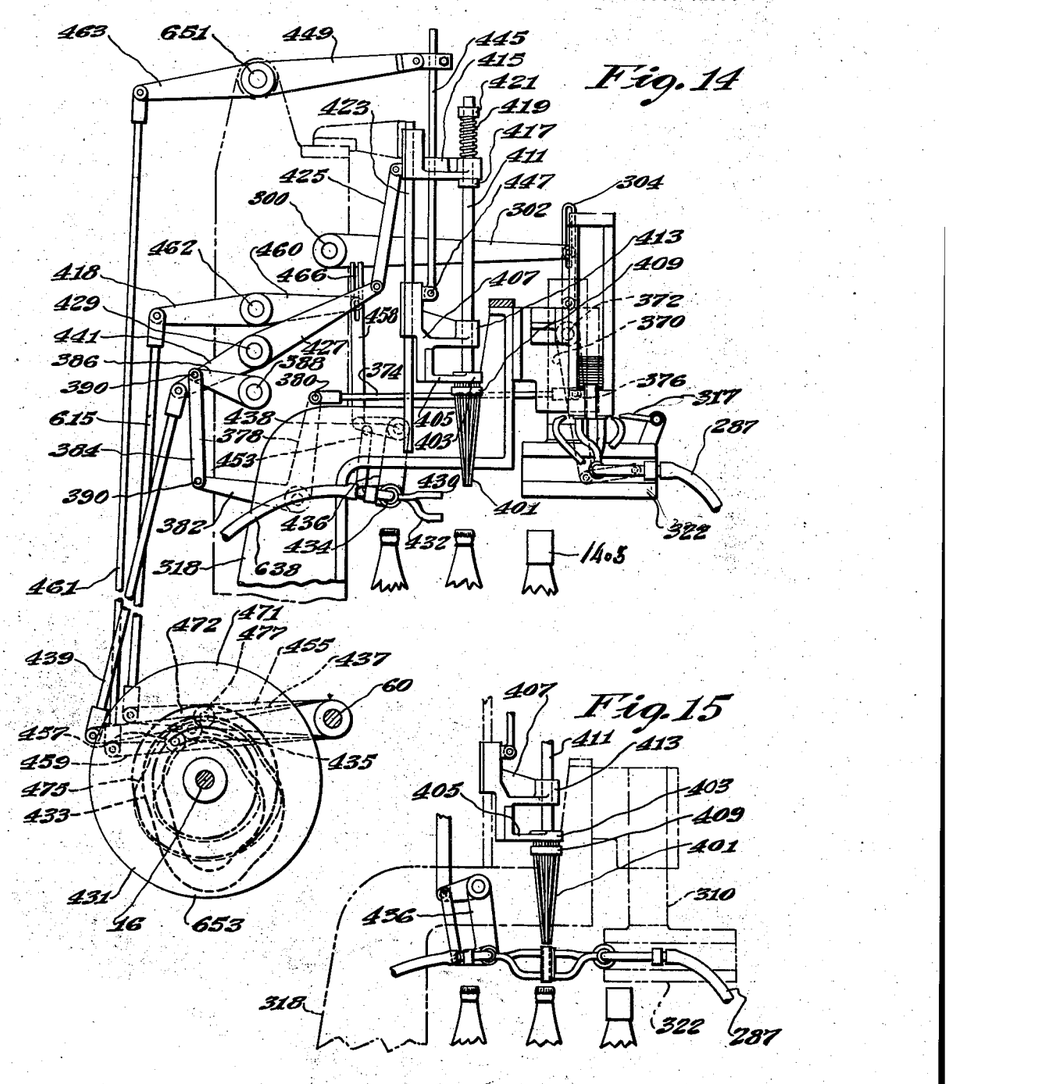
Fig. 14 is a side elevation of the band feeding and applying mechanism.
Fig. 15 is a side elevation of the band applying mechanism in position to enter a partially opened band or sleeve.

Provision is made for raising and lowering the bracket 407 which supports and positions the band applying mechanism to raise it up out of the way when a band is brought into applying position and to thereafter move it downwardly so that the wires 401 in collapsed condition may enter the partially opened band held by the band feeder before the expanding collar 409 begins to move to expand the band and push it onto the bottle neck. Referring to Fig. 14, the bracket 407 slidably mounted on the slide bar 423 is operated through a connecting rod 445 pivotally connected to the slide 407 by a pin 447, and adjustably connected to the outer end of an arm 449 secured to a shaft 651. The latter is rocked by means of a cam 653 secured to the main cam shaft 16. The cam 653 is provided with a suitable cam path 475 cooperating with a roller 457 located intermediate the ends of a cam lever 459 pivoted on the shaft 60, the outer end of said lever being connected by a connecting rod 461 to the outer arm of a lever 463 secured to the shaft 651.

Provision is made for controlling the feeding of the bands in accordance with the transfer of a bottle from the incoming conveyor by the pusher 200 to the end that when no bottles are transferred, no bands will be fed. This mechanism comprises a finger 501 mounted on the upper end of a shaft 503 and normally caused to remain in the path of travel of a bottle by a spring 505. The latter is connected to the outer end of an arm 507 secured to the shaft 503 and a spring stud 508 secured in the bracket 510 mounted on the machine frame. An adjustable stop screw 512 located intermediate the arm 507 bears against a portion of the bracket 510 and serves to properly position the finger 501. The shaft 503 is journaled in bearings 516 at the top of the bracket 510. The lower portion of the shaft is journaled in bearings 518 formed on the lower portion of the bracket 510. A latching arm 520 secured to the lower end of the shaft 503 is normally held in locking engagement with an arm 522 secured to the valve shaft 293 of the valve 288 and thus prevents the valve from opening to supply suction to the suction plate 286 of the band feeder 280. When, however, a bottle is pushed from the incoming conveyor 50 by the pusher 200, it contacts with the finger 501 and swings the arm 520 out of engagement with the arm 522 allowing the valve to open and permitting the band feeder 280 to operate and remove the lowermost band from the magazine 260. The cam 305 for operating the valve 288 is an open cam and the roller 303 is normally held against the face of the cam by a spring 526, one end of which is attached intermediate the ends of the arm 301, the other end being fastened to a bracket 528.

While certain features of the invention are particularly designed for use in the automatic application of bands of wet regenerated cellulose to the necks of bottles, nevertheless, it is not desired to limit the use of the invention thereto, as other bands may be applied to other forms of containers.

Having thus described the invention, what is claimed is:

1. In a machine for applying a contractible sleeve to the neck of a bottle to form a seal for the cap comprising means for engaging and holding the sleeve in an open position, an expansible member insertable into the sleeve thus held, bottle supporting means for supporting a bottle in operative position with relation to the sleeve applying mechanism, and means for moving the sleeve from the expansible member onto the neck of the bottle over the cap and into a position where a portion thereof overlies the skirt portion of the cap.

2. The combination with operating mechanism for operating upon an article, of an incoming conveyor, an outgoing conveyor spaced from the incoming conveyor, a pusher member arranged to reciprocate transversely of the incoming conveyor for transferring successive articles to a position intermediate said conveyors, a second pusher member arranged to reciprocate longitudinally between said conveyors for moving successive articles out of the path of the first pusher member and into a position to be operated upon by said operating mechanism, and means for transferring successive articles after they have been operated upon by the operating mechanism onto the outgoing conveyor.

3. The combination with an incoming conveyor, of an outgoing conveyor spaced therefrom, operating mechanism located between the conveyors, and transferring mechanism for transferring successive articles from the incoming conveyor into a position to be operated upon by the operating mechanism and then onto the outgoing conveyor, said mechanism including a pusher arranged to reciprocate transversely of the incoming conveyor, a second pusher arranged to move the article out of the path of the first pusher and into operative relation to said operating mechanism, and a third pusher reciprocating transversely of the outgoing conveyor for moving the article onto the outgoing conveyor.

4. The combination with an incoming conveyor, of an outgoing conveyor spaced therefrom, operating mechanism located between the conveyors, and transferring mechanism for transferring successive articles from the incoming conveyor into a position to be operated upon by the operating mechanism and then onto the outgoing conveyor, said mechanism including a pusher for moving the article from the incoming conveyor to a position intermediate the conveyors, a second pusher arranged to move the article longitudinally between said conveyors into a position to be operated upon by the operating mechanism, and a third pusher arranged to cooperate with the second pusher to assist in holding the article at the operating station and for transferring the article from such station onto the outgoing conveyor after the article has been operated upon.

5. The combination with an incoming conveyor, of an outgoing conveyor spaced therefrom, operating mechanism located between the conveyors, and transferring mechanism for transferring successive articles from the incoming conveyor into a position to be operated upon by the operating mechanism and thence onto the outgoing conveyor, said transferring mechanism including a pusher member arranged to reciprocate transversely across the incoming conveyor, conveying means for conveying successive articles from the position into which they are moved by said pusher into operative relation to the operating mechanism, and means for thereafter transferring the articles from the operating station to the outgoing conveyor, said conveying means and the last mentioned transferring means cooperating to hold the article at the operating station.

6. In a machine for applying a banding sleeve to a container, in combination, mechanism for feeding successive sleeves from a bulk supply thereof, mechanism for opening said sleeve, mechanism for delivering successive containers into a position below a sleeve thus opened including an incoming conveyor, a pusher member arranged to reciprocate transversely thereof for pushing successive containers into an intermediate position, separate means for transferring successive containers from such intermediate position into a position beneath said open sleeve, mechanism for moving the sleeve downwardly over the upper end of the container thus positioned to thereby apply the sleeve to the container, and mechanism for transferring the container from such sleeve applying position onto the outgoing conveyor.

7. In a machine for applying a banding sleeve to a container, in combination, means for operatively supporting a container, suction means for engaging and holding a banding sleeve, said suction means assisting in opening the sleeve, an expansible member, means for moving the same to introduce the expansible member to within the sleeve and for thereafter effecting expansion of the member to open the same, and means cooperating with the sleeve for moving it relative to said expansible member to apply the sleeve onto the container over an end thereof.

8. In a machine for applying a banding sleeve to a container, in combination, means for operatively supporting a container, a magazine for holding a bulk supply of collapsed sleeves, means for withdrawing successive sleeves from said magazine including a movable suction member, means for effecting the opening of the sleeve including a second suction member cooperating with the opposite portion of the sleeve, and pneumatic means for directing an air jet into the interior of the sleeve, and means for applying the opened sleeve onto the container over an end thereof.

9. In a machine for applying a banding sleeve to a container, means for operatively supporting the container, a magazine for storing a bulk supply of collapsed sleeves, means for withdrawing successive sleeves from the magazine including a movable suction member for withdrawing a sleeve from the magazine and positioning it over the container to which it is to be applied, means for effecting the opening of the sleeve while the latter is held by said suction member including a second and opposed suction member for cooperating with the opposite portion of the sleeve, means for directing an air jet into the interior of the sleeve and an expansible member adapted to be inserted into the sleeve to expand the sleeve into an open condition, and means for thereafter moving the sleeve onto the container over the end thereof.

10. In a machine for applying banding sleeves to containers, in combination, band applying mechanism, an incoming conveyor, means for transferring successive containers from the incoming conveyor to operative position with respect to the band applying mechanism including a pusher arranged to reciprocate transversely of the incoming conveyor, and a feeler member operated by pressure exerted by the line of containers on the incoming conveyor for controlling the operation of said pusher.

11. In a machine for applying banding sleeves to containers, in combination, an incoming conveyor, a plurality of band applying mechanisms disposed in spaced relation along said conveyor, means for effecting the transfer of containers from the incoming conveyor to said several band applying mechanisms including a plurality of spaced pusher members reciprocating transversely of the incoming conveyor at spaced intervals along the length thereof, a feeler adapted to be operated by the pressure of the line of containers being conveyed by the incoming conveyor, and connections between the feeler and the several pusher members for controlling the operation of the latter, said feeler having provision whereby its operation may be adjustable to respond to different pressures.

RALPH C. STROUT.